United States Patent [19]
Ouchi

[11] Patent Number: 5,847,869
[45] Date of Patent: Dec. 8, 1998

[54] MICROSCOPE PHOTOGRAPHY LENS SYSTEM

[75] Inventor: Yumiko Ouchi, Tokyo, Japan

[73] Assignee: Nikon Corporation, Tokyo, Japan

[21] Appl. No.: 912,013

[22] Filed: Aug. 15, 1997

[30] Foreign Application Priority Data

Aug. 16, 1996 [JP] Japan ................................. 8-216229

[51] Int. Cl.$^6$ ............................. G02B 13/06; G02B 25/00
[52] U.S. Cl. ........................... 359/434; 359/362; 359/645
[58] Field of Search ................................... 359/362–382, 359/420–422, 431–435, 643–645, 656, 661, 689, 690, 719, 744, 748, 753, 784–790

[56] References Cited

U.S. PATENT DOCUMENTS

| | | | |
|---|---|---|---|
| 4,867,549 | 9/1989 | Sekine | 359/434 |
| 5,546,228 | 8/1996 | Ouchi | 359/645 |
| 5,568,319 | 10/1996 | Kaneko et al. | 359/645 |

FOREIGN PATENT DOCUMENTS

| | | | |
|---|---|---|---|
| 3813992 | 1/1989 | Germany | 359/645 |
| 57-171312 | 10/1982 | Japan | 359/645 |

*Primary Examiner*—Thong Nguyen
*Attorney, Agent, or Firm*—Michael N. Meller

[57] ABSTRACT

The present invention allows one to take an intermediate image formed by a microscope objective lens system and reform a clear image of it, at relatively low magnification, on a film surface. The present invention provides for a lens system which comprises, in order, from the observed object end, a first lens group having a convex surface facing toward the objective lens system end, and having positive refractive power, a second lens group, positioned to the rear of the intermediate image, and having negative refractive power, and a third lens group having positive refractive power. The lenses in the system are set to follow predetermined parameters.

10 Claims, 9 Drawing Sheets

MICROSCOPE PHOTOGRAPHY LENS SYSTEM

BACKGROUND OF THE INVENTION

The present invention relates to a microscope photography lens system used to photograph microscope observation images. More specifically, it relates to a microscope photography lens system for enlarging the intermediate image of an observed object, as formed by the objective lens system of a microscope, and directing the image of the observed object onto a photographic surface.

It has long been common to photograph microscope observation images. The lenses used for this type of photography, however, are usually "high-power" (4× or 5×) enlargement lenses. In prior microscope photography, photography was performed by using these high-power photo lenses to enlarge the intermediate (primary space) image formed by the microscope's objective optics, and forming the resulting image on film.

Normally, the size (field number) of the primary space image formed by the microscope objective optics is on the order of 25 mm. For an image obtained with a field number of this size, however, the range (diameter) within which a flat image plane can be obtained (the range within which a good image can be observed when the center of the image is in focus) is somewhat limited. For example, with an achromat objective lens, the range over which acceptable image plane flatness can be obtained is approximately 18 mm.

When observations are made with the human eye, the flat image range is not much of a problem because you can focus on the center to look at the center, and focus on the periphery to look at the periphery. In microscopic photography, however, if the photograph is made with the center in focus, the image within the flat image range will be clear, but that around the periphery will be blurred. For this reason, in the photo lens, the primary space image is enlarged so that photographs can only be taken within that area where a flat image can be obtained. For example, if photographs are being made using 35 mm film, since the diagonal dimension of 35 mm film is 43.2 mm, and if flatness can be secured over an 18 mm range, the photo lens will have to be one that magnifies this 18 mm to at least 43.2 mm (i.e. a lens with an magnification ratio of approximately 2.5× or greater).

In the field of pathology, however, there has been a growing demand recently for the capability to perform wide field microscopic photography. This demand has resulted in the development of microscope objective lenses having low and ultra-low magnification ratios. Such objective lenses, especially those for photography, are now being designed so that flatness can be obtained over the entire field. This, in turn, has created a growing need for photographic lenses with magnification ratios lower than have previously been available, so that the advantage of these flat primary space images formed within the microscope (images that are flat over a wide area) will not be squandered.

SUMMARY OF THE INVENTION

To accomplish this object, the present invention is configured as a microscope photography lens system having an objective lens system for directing an intermediate image of an observed object formed by an objective lens system onto a photographic surface, wherein said microscope photography lens system comprises, in order, from the observed object:

a) a first lens group having a convex surface facing toward the objective lens system and having an overall positive refractive power;

b) a second lens group having a concave surface facing toward the objective lens system, which is located between said intermediate image and a third lens group, and having an overall negative refractive power; and c) said third lens group having at least two lens elements with a front end facing towards the objective lens system and a rear end and wherein the third lens group has a positive refractive power.

The microscopic photography lens system has the parameters that satisfy mathematical expressions: (1), (2), (3), and (4), which are shown below.

Condition 1

$$-0.1 \geq d/L \geq -0.4 \tag{1}$$

where d is the distance from the intermediate image to the convex surface of the first lens group, and L is the distance from the convex surface of the first lens group to the rear end of the third lens group.

Condition 2

$$0.1 \leq D_2/D_1 \leq 1.0 \tag{2}$$

where $D_1$ is the distance between the first lens group and the second lens group, and $D_2$ is the distance between the second lens group and the third lens group.

Condiiton 3

$$0.2 \leq |r_{21}/f_3| \leq 0.6 \tag{3}$$

where $r_{21}$ is the curvature radius of the concave surface of the second lens group facing towards the objective lens system, and $f_3$ is the focal length of the third lens group.

Condition 4

$$15 \leq (\upsilon_{3(max)} - \upsilon_{3(min)}) \tag{4}$$

where $\upsilon_{3(max)}$ is the highest Abbe number from the lens elements of the third lens group, and $\upsilon_{3(min)}$ is the lowest Abbe number from the lens elements of the third lens group.

All distances are positive when they are measured to the image side from the optical source.

BRIEF DESCRIPTION OF THE PREFERRED EMBODIMENTS

Figure 1:
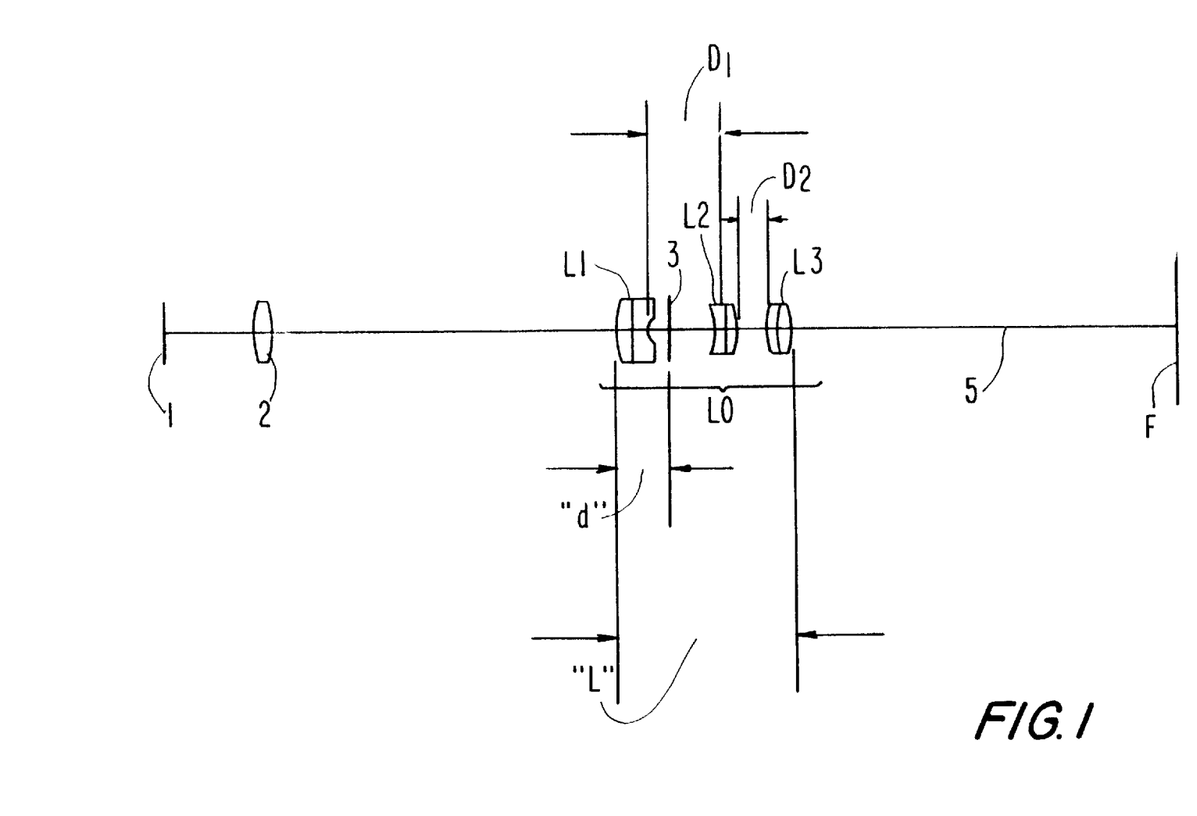
FIG. 1 is a simplified drawing showing a microscope lens configuration in which the microscope photography lens system (lens system) of the present invention is installed.

In the following paragraphs, the preferred mode of implementing the invention is described, with reference to FIGS. 1–13 of the drawings. FIG. 1 is the microscope photography lens system (lens system) L0 of the present invention, as installed in the optical system of a microscope. Light from observed object 1, is passed through objective lens system 2, becoming incident upon a prescribed location along optical axis 5 to form intermediate image 3. Through lens system L0, an image of this intermediate image 3 is then formed on photographic film F, to thus perform microscopic photography of the observed object 1.

The lens system L0 of the present invention has a magnification ratio sufficiently low (as discussed in the Background of the Invention) to handle the intermediate image 3 formed by the objective lens system 2 of the microscope over a wide field. One feature of this lens is that it has a comparatively long focal length. Also, in microscope photography systems, the light measurement light path and shutter mechanism are normally provided internal to the lens system. Therefore, in consideration of the rate at which accessories are being added to these systems, the shorter the total lens length of the lens system L0, the better. The lenses in the present invention also satisfy this requirement.

To be used in a microscope, lens system L0 of this type must have a long focal length, and yet be containable within a small space. For this reason, it is desirable for the principal point separation of this lens system L0 (the distance between its front and rear principal points) to be a negative value. As shown in the drawing, in the present invention, lens system L0, is made up of three lens groups, in order, from the observed object 1: a first lens group L1, which has positive refractive power, a second lens group L2, which has negative refractive power, and a third lens group L3, which has positive refractive power. This configuration provides the desired lens with a long focal length and a principal point separation that is a negative value.

Also, most of the light beams that form the image space through the objective optics of the microscope, are generally divergent beams. For this reason, in the lens system L0 of the present invention in particular, which is designed for photography of the full field of the intermediate image 3, placing first lens group L1 (which has a convex surface S1 facing toward the objective lens system 2, and has positive refractive power overall) between the objective lens system 2 and the intermediate image 3, causes it to convert the light beams to a generally convergent nature, thus serving to reduce the physical size of the lens system L0.

In addition, to provide well-balanced corrections for various aberrations in the present invention, conditions are set as indicated by conditional mathematical expressions (1) through (4) above.

First, conditional mathematical expression (1), which defines conditions related to astigmatism and entrance pupil position, is used to determine the position of first lens group L1. With this kind of lens, the entrance pupil varies, depending on how the objective optics are selected (type). To accommodate a broad pupil range, it is desirable to position first lens group L1 near the intermediate image 3. In other words, it is desirable for "d" of mathematical expression 1 to be small.

Also, to optimize the flatness of the image plane of intermediate image 3, a concave-surface lens must be placed somewhere within the lens system L0 to correct for Petzval's sum. It is best to position this lens near intermediate image 3. The reason for this is that a sharply concave surface can have a detrimental influence on aberrations by causing a bending of spherical aberrations and astigmatism, etc. This detrimental influence can be held to a minimum, however, by placing the lens near intermediate image 3, where the beam becomes narrow.

If the lower limit of conditional mathematical expression (1), is exceeded, i.e., if (d/L)<−0.4, there will be too large of a change in astigmatism when the entrance pupil is changed, causing a sharp degradation in image resolution at the periphery. If the upper limit is exceeded, i.e., if (d/L)>−0.1, this will put the position of first lens group L1 to the rear of intermediate image 3, or near the rear end of the lens system L0. This would require that the diameter of first lens group L1 be made larger, especially when the entrance pupil is nearby, thereby increasing the physical size of the lens system L0. Thus, it is preferable to design the lens system L0 to satisfy conditional mathematical expression (5).

Mathematical Expression 5

$$-0.15 \geq d/L \geq -0.3 \qquad (5)$$

Conditional mathematical expression (2) determines the relationship between the separation between first lens group L1 and second lens group L2, and that between second lens group L2 and third lens group L3. The conditions defined by this conditional mathematical expression constitute the most important factors with respect to realizing the "low magnification power (long focal length) lens system L0 with a short total lens length" feature of the present invention.

If the upper limit of conditional mathematical expression (2) is exceeded, i.e., if $(D_2/D_1)>1.0$, although it will be possible to achieve the desired shortness in the total length of lens system L0, the refractive power of the lenses will be too strong, taxing the configuration, causing problems such as radical changes in magnification ratio chromatic aberration when there is an increase in the height of the image, thus making it difficult to provide well-balanced corrections for aberrations in the lens system L0.

If the lower limit of conditional mathematical expression (2) is exceeded, i.e., if $(D_2/D_1)<0.1$, the principal point separation will be narrowed, thereby causing problems with increased overall lens length. If the configuration is force-fitted to within a prescribed lens length with $(D_2/D_1)<0.1$, it will not be possible to correct for distortion. For this reason, it is preferable to design the system to satisfy conditional mathematical expression (6).

Mathematical Expression 6

$$0.2 \leq D_2/D_1 \leq 0.8 \qquad (6)$$

Conditional mathematical expression (3) determines the relationship between the curvature radius of the outermost lens surface on the observed object end of second lens group L2 and the focal length of third lens group L3. Like conditional mathematical expression (2), satisfying conditional mathematical expression (3) is also important for constructing a lens system L0 that features low magnification power and short total lens length, while at the same time realizing well-balanced correction for aberrations. Moreover, it is preferable to make the outermost lens surface on the observed object end of second lens group L2, concave. In other words, in conditional mathematical expression (3), it is preferable to make $r_{21}$, the curvature radius of this lens surface, a negative value.

If the upper limit of conditional mathematical expression (3) is exceeded (if $|r_{21}/f_3|>0.6$), the focal length in third lens group L3 will increase, causing a corresponding strengthening of the refractive power of first lens group L1, resulting in coma aberration, and of particular concern, coma aberration of light rays that pass outside of first lens group L1 and are therefore not correctable. On the other hand, if the lower limit is exceeded (if $|r_{21}/f_3|<0.2$), the refractive power of third lens group L3 will be strengthened, thereby increasing the spherical aberration bending, in turn making it more difficult to provide well-balanced corrections for aberrations in the lens system L0. Preferably, the lens system L0 should be set to satisfy conditional mathematical expression (7):

Mathematical Expression 7

$$0.25 \leq |r_{21}/f_3| \leq 0.45 \qquad (7)$$

Conditional mathematical expression (4) defines the Abbe number of third lens group L3 to cause it to correct for axial chromatic aberration. If the lower limit of conditional mathematical expression (4) is exceeded (if the Abbe number is less than 15) the axial chromatic aberration correction will be inadequate. Preferably, the lens system L0 should be set to satisfy conditional mathematical expression (8):

Mathematical Expression 8

$$25 \leq (v_{3(max)} - v_{3(min)}) \qquad (8)$$

WORKING EXAMPLES

Next, specific examples of the microscope photography lens system L0 of the present invention having specifications that satisfy the above conditions will be described.

Example 1

Figure 2:
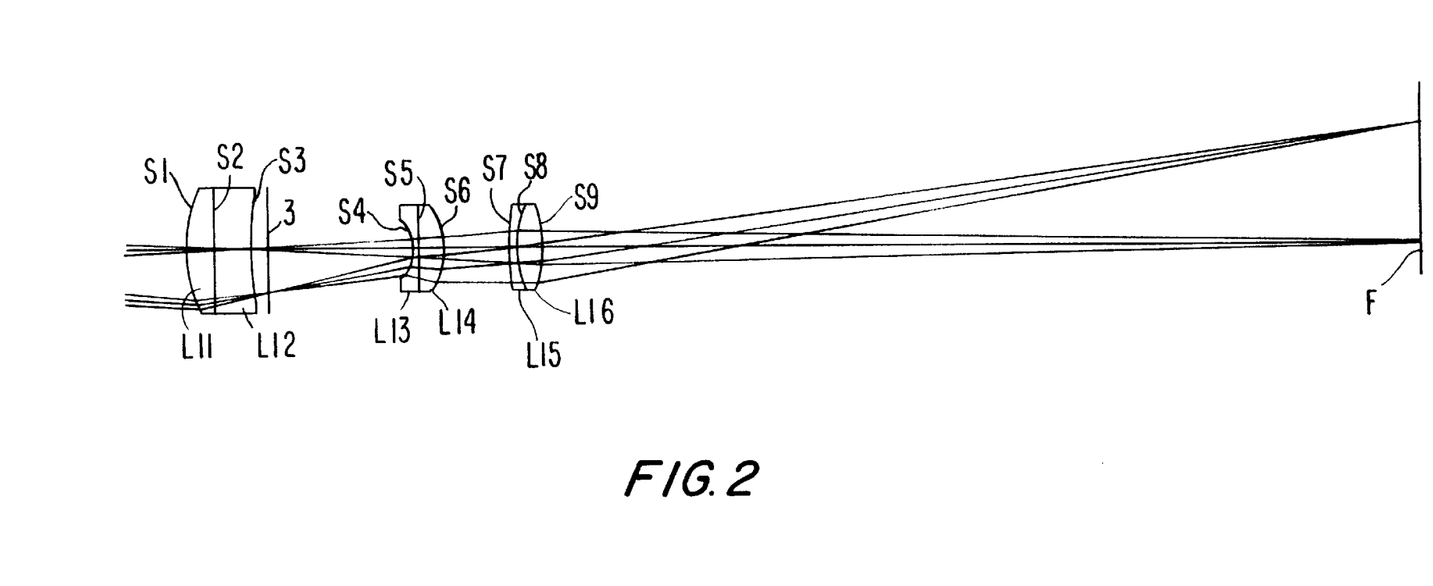
FIG. 2 is a simplified drawing showing the lens system of the first working example of the present invention.

FIG. 2 shows the lens configuration of the first working example. In this example, lens system L0 is made up of the following lens groups, arranged as shown in the drawing:

a) a first lens group L1, which combines convex lens L11 and concave lens L12, and has overall positive refractive power;

b) a second lens group L2, which combines concave lens L13 and convex lens L14, and has overall negative refractive power; and c) a third lens group L3, which combines concave lens L15 and convex lens L16, and has overall positive refractive power.

As shown in the drawing, with lens system L0 installed in a microscope, the ojective lens system 2 forms an intermediate image 3 of the observed object 1 between the first lens group L1 and the second lens group L2. The secondary image is formed through lens system L0 on film F, to make the photograph.

With lens surface specifications as listed in Table 1, for a lens system L0 with a magnification ratio $\beta=-2$ (X) and numerical aperture N.A.=0.04, the position of the entrance pupil is −300 mm, as measured from the position of intermediate image 3 (a position of 300 mm at the observed object 1), the position of first lens surface S1 is −15 mm, as measured from the position of intermediate image 3 (a position of 15 mm at the observed object 1), and the focal length of the overall lens system is f=90.5 mm.

TABLE 1

| Lens Surface | Curvature Radius (r) | Surface Separation (d) | Index of Refraction (nd) | Abbe Number (v) |
|---|---|---|---|---|
| S1 | 25.434 | 5.0 | 1.804109 | 46.55 |
| S2 | ∞ | 7.0 | 1.625882 | 35.70 |
| S3 | 52.116 | 29.9 | 1.0 | |
| S4 | −8.994 | 1.0 | 1.748099 | 52.30 |
| S5 | ∞ | 4.5 | 1.698950 | 30.04 |
| S6 | −13.623 | 12.7 | 1.0 | |
| S7 | 51.413 | 1.0 | 1.784702 | 26.05 |
| S8 | 15.953 | 5.0 | 1.620409 | 60.14 |
| S9 | −25.211 | | | |

Figure 3A:
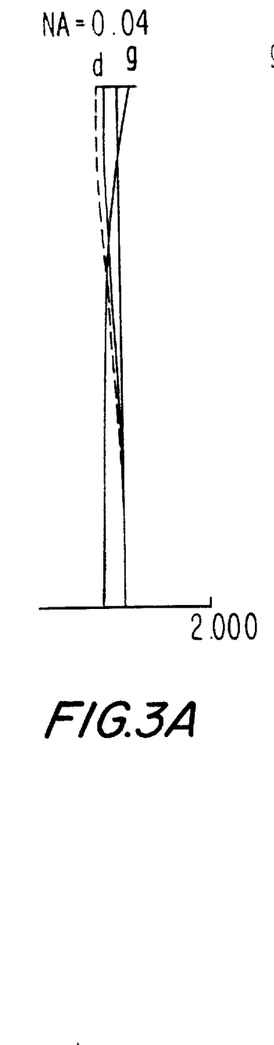
FIG. 3 is a drawing showing spherical aberration, astigmatism-aberration, and distortion-aberration in the microscope photography lens system of the first working example.
Figure 3B:
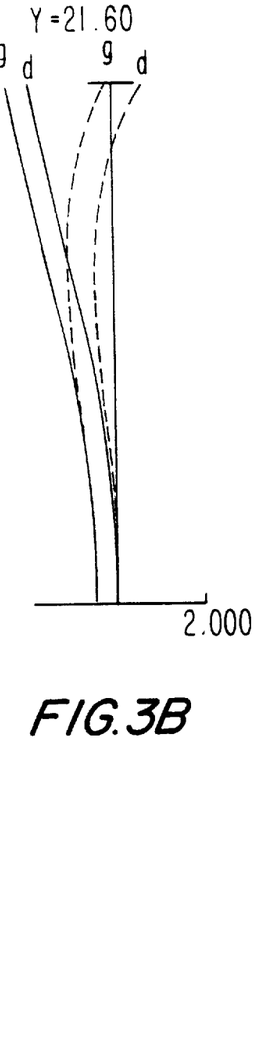
Figure 3C:
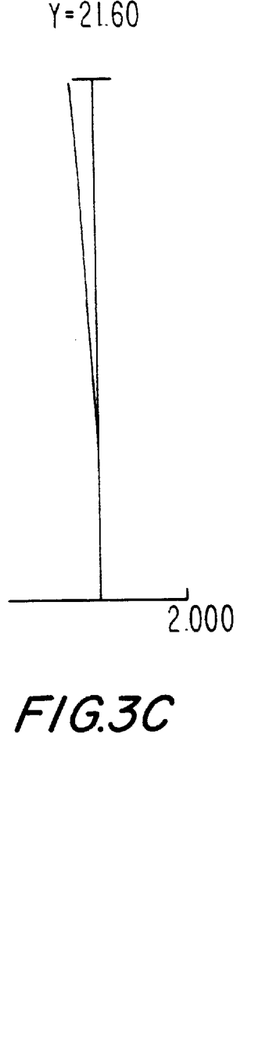
Figure 4:
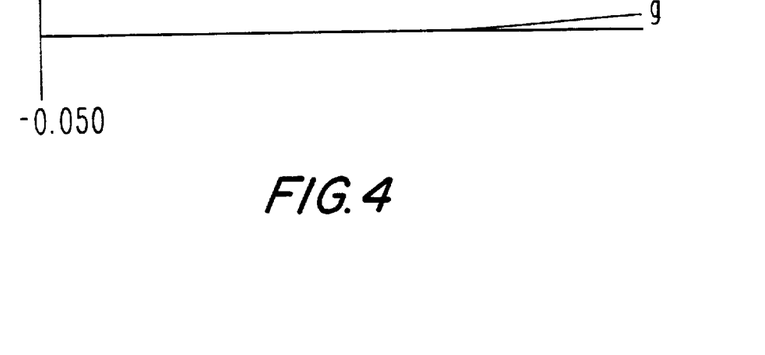
FIG. 4 is a drawing showing lateral chromatic aberration in the microscope photography lens system of the first working example.
Figure 5A:
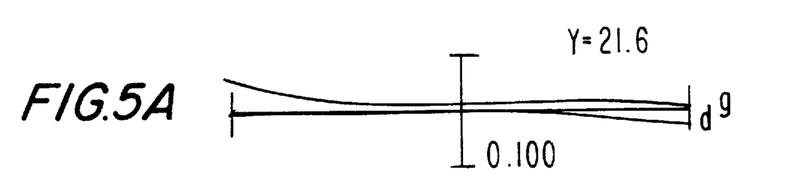
FIG. 5 is a drawing showing coma aberration at image heights of Y=21.6 mm, Y=15.2 mm, and Y=0.0 mm in the microscope photography lens system of the first working example.
Figure 5B:
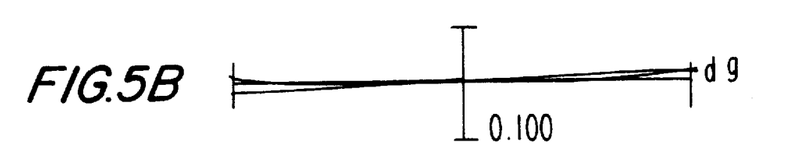
Figure 5C:
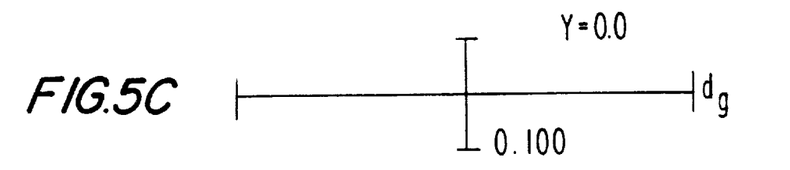

FIGS. 3 through 5 show the various aberrations associated with a lens system L0 constructed to the above specifications. Shown from left to right in FIG. 3 are spherical aberration (d-line and g-line), astigmatism-aberration (d-line and g-line), and distortion-aberration. In the spherical aberration diagram, the solid line shows the magnitude of the spherical aberration, and the dotted line shows the magnitude of the sine condition violation. In the astigmatism diagram, the solid lines show the sagittal image surface and the dotted lines show the meridional image surface. The "d" and "g" in the diagrams denote the spectral d-line and g-line. FIG. 4 shows the lateral chromatic aberration. FIG. 5 shows the coma-aberration. Shown in order from top to bottom, are the lateral aberrations for image heights of Y=21.6, Y=15.2, and Y=0 (on-axis).

Table 2 lists the values as defined in the above conditional expressions (1) through (4) for the lens system L0 of the present example. The focal length of the third lens group for this example is 34.4 mm.

TABLE 2 d/L = −0.23
$D_2/D_1$ = 0.42
$(r_{21}/f_3)$ = −0.26
$(\nu_{3\,(max)} - \nu_{3\,(min)})$ = 34.09

Example 2

Figure 6:
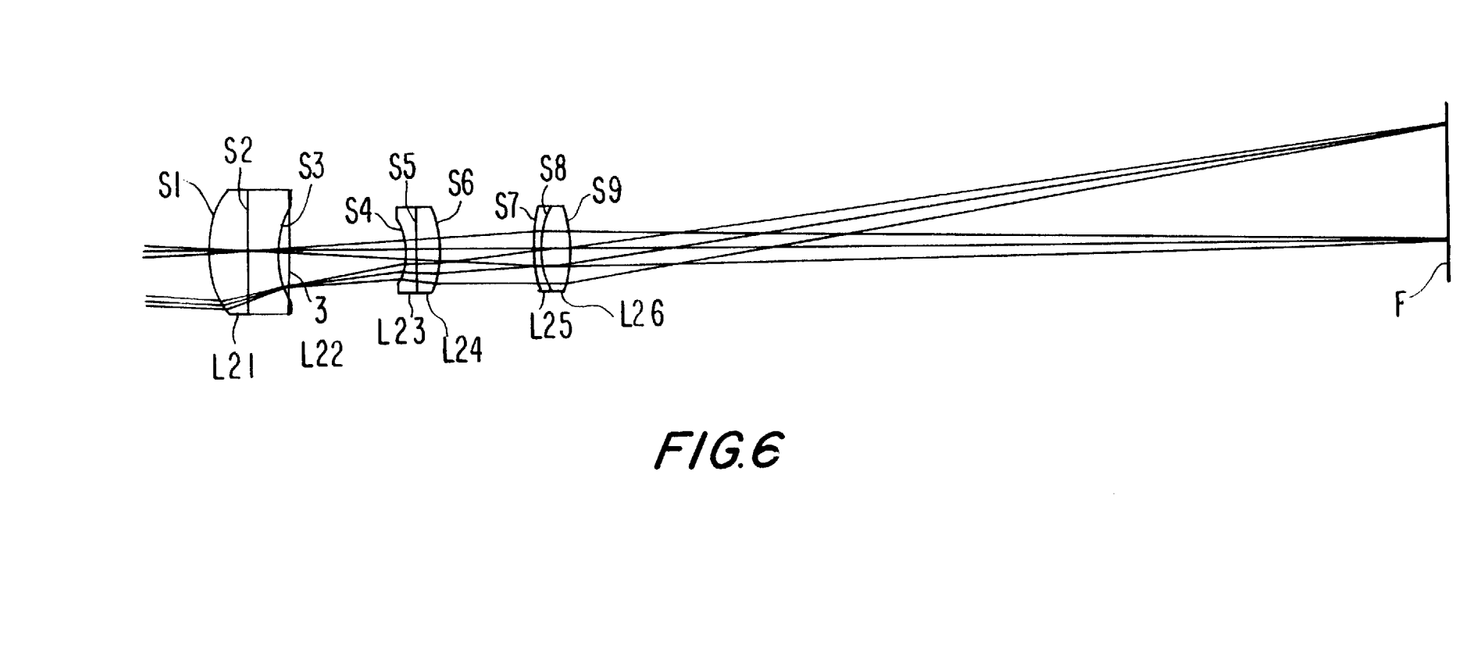
FIG. 6 is a simplified drawing showing the configuration of the microscope photography lens system of the second working example of the present invention.

FIG. 6 shows the lens configuration of the second working example. In this example, lens system L0 is made up of the following lens groups, arranged as shown in the drawing:

a) a first lens group L1, which combines convex lens L21 and concave lens L22, and has overall positive refractive power;

b) a second lens group L2, which combines concave lens L23 and convex lens L24, and has overall negative refractive power; and c) a third lens group L3, which combines concave lens L25 and convex lens L26, and has overall positive refractive power.

As shown in FIG. 6, with lens system L0 installed in a microscope, the objective lens system 2 forms an intermediate image (3) of the observed object 1, in between the first lens group L1 and the second lens group L2. The intermediate image 3 is so close to the first lens group that portions of intermediate image 3 and concave lens 22 actually overlap, i.e. occupy the same position. The secondary image is formed through lens system L0 on film F, to make the photograph.

With lens surface specifications as listed in Table 3, for a lens system L0 with a magnification ratio β=−2 (X) and numerical aperture N.A.=0.04, the position of the entrance pupil is −300 mm, as measured from the position of intermediate image 3 (a position of 300 mm at the observed object 1). The position of first lens surface S1 is −15 mm, as measured from the position of intermediate image 3 (a position of 15 mm at the observed object 1), and the focal length of the overall lens system is f=78.9 mm.

TABLE 3

| Lens Surface | Curvature Radius (r) | Surface Separation (d) | Index of Refraction (nd) | Abbe Number (ν) |
| --- | --- | --- | --- | --- |
| S1 | 18.844 | 7.0 | 1.840421 | 43.35 |
| S2 | 125.900 | 6.0 | 1.625882 | 35.70 |
| S3 | 15.979 | 23.9 | 1.0 | |
| S4 | −10.697 | 2.0 | 1.516800 | 64.10 |
| S5 | −81.258 | 4.0 | 1.717360 | 29.46 |
| S6 | −19.629 | 17.7 | 1.0 | |
| S7 | −34.617 | 1.0 | 1.784702 | 26.05 |
| S8 | 15.874 | 5.0 | 1.563840 | 60.69 |
| S9 | −30.515 | | | |

Figure 7A:
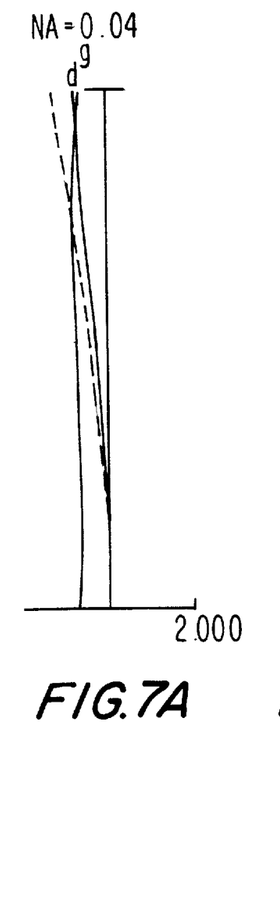
FIG. 7 is a drawing showing spherical aberration, astigmatism-aberration, and distortion-aberration in the microscope photography lens system of the second working example.
Figure 7B:
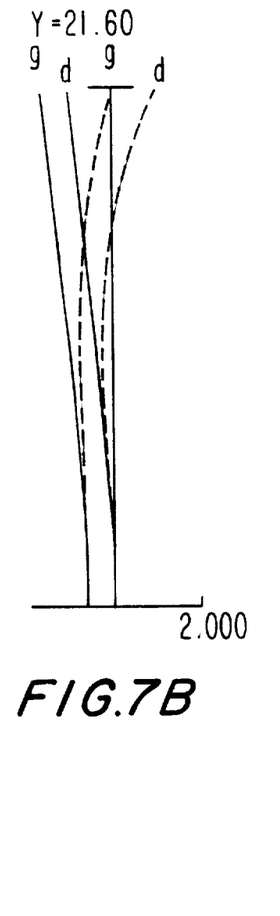
Figure 7C:
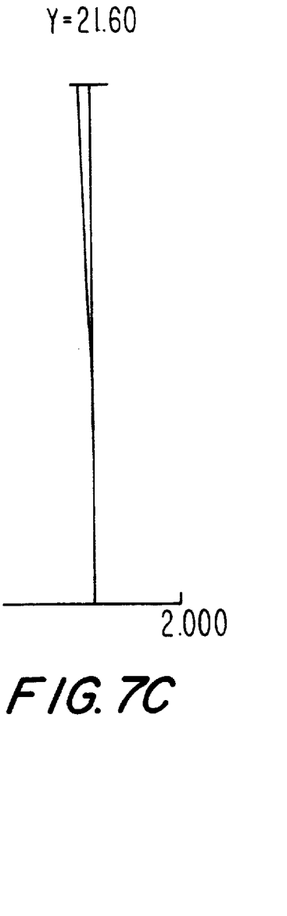
Figure 8:
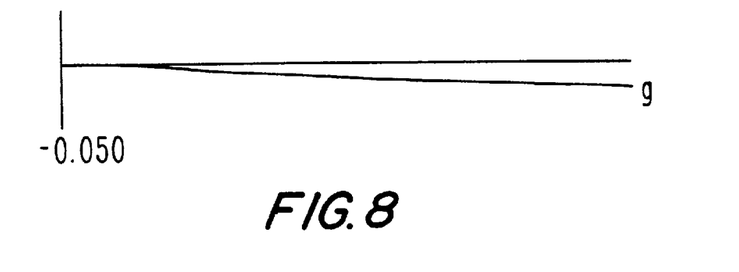
FIG. 8 is a drawing showing lateral chromatic aberration in the microscope photography lens system of the second working example.
Figure 9A:
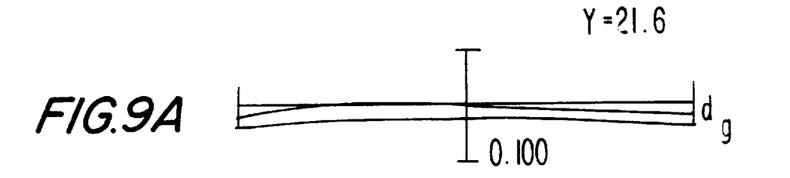
FIG. 9 is a drawing showing coma aberration at image heights of Y=21.6 mm, Y=15.2 mm, and Y=0.0 mm in the microscope photography lens system of the second working example.
Figure 9B:
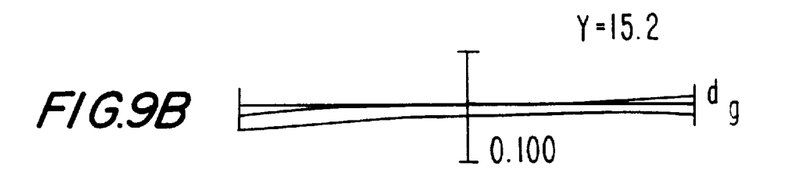
Figure 9C:
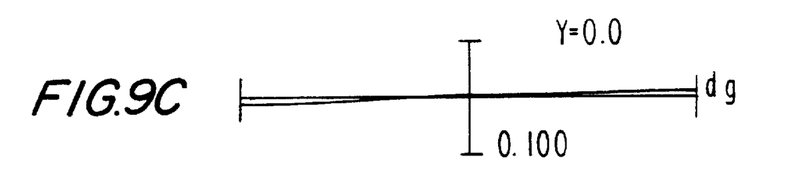

FIGS. 7 through 9 show the various aberrations associated with a microscope lens system L0 constructed to the above specifications. Shown from left to right in FIG. 7 are spherical aberration (d-line and g-line), astigmatism-aberration (d-line and g-line), and distortion-aberration. In the spherical aberration diagram, the solid line shows the magnitude of the spherical aberration, and the dotted line shows the magnitude of the sine condition violation. In the astigmatism diagram, the solid lines show the sagittal image surface and the dotted lines show the meridional image surface. The "d" and "g" in the diagrams denote the spectral d-line and g-line. FIG. 8 shows the lateral chromatic aberration. FIG. 9 shows coma aberration. Shown in order from top to bottom, are the coma aberrations for image heights of Y=21.6, Y=15.2, and Y=0 (on-axis).

Table 4 lists the values as defined in the above conditional mathematical expressions (1) through (4) for the microscope photography lens system L0 of the present example. The focal length of the third lens group for this example is 37.5 mm.

TABLE 4 d/L = −0.23
$D_2/D_1$ = 0.74
$(r_{21}/f_3)$ = −0.29
$(\nu_{3\,(max)} - \nu_{3\,(min)})$ = 34.64

Example 3

Figure 10:
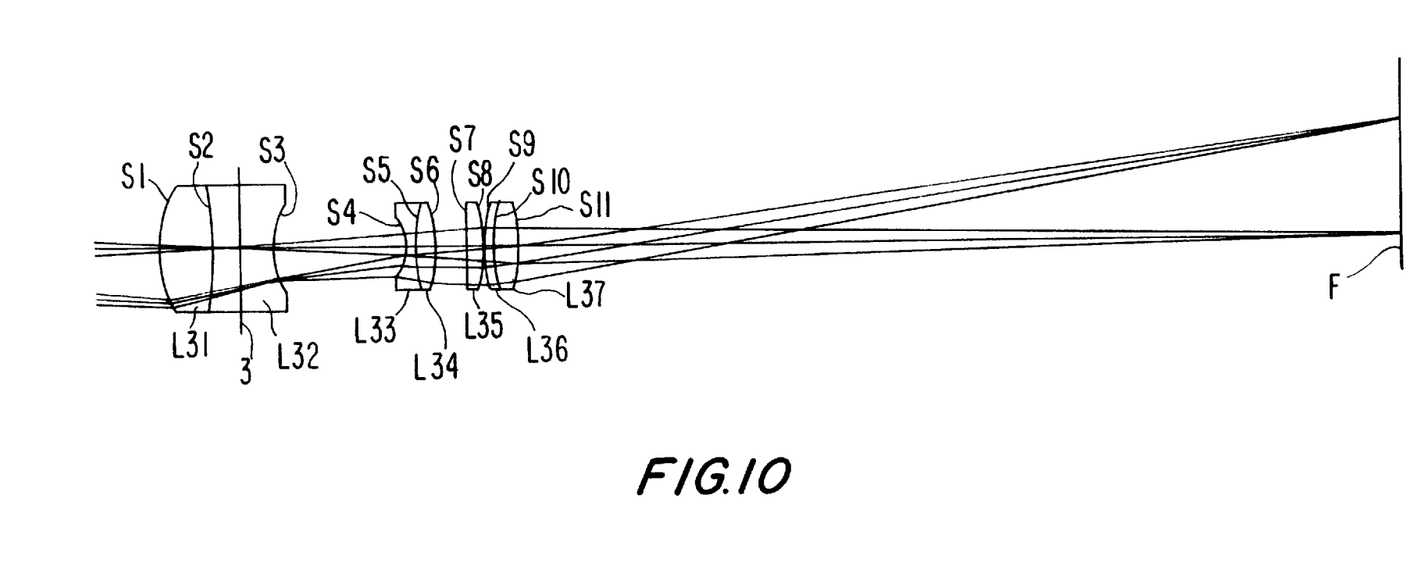
FIG. 10 is a simplified drawing showing the configuration of the microscope photography lens system of the third working example of the present invention.

FIG. 10 shows the lens configuration of a third working example. In this example, lens system L0 is made up of the following lens groups, arranged as shown in the drawing:

a) a first lens group L1, which combines convex lens L31 and concave lens L32, and has overall positive refractive power;

b) a second lens group L2, which combines concave lens L33 and convex lens L34, and has overall negative refractive power; and c) a third lens group L3, which combines convex lens L35, concave lens L36, and convex lens L37, and has overall positive refractive power.

As shown in the drawing, with lens system L0 installed in a microscope, the objective lens system 2 forms an intermediate image 3 of the observed object 1, positioned inside concave lens L32 of first lens group L1. The secondary image is formed through lens system L0 on film F, to thus make the photograph.

With lens surface specifications as listed in Table 5, for a lens system L0 with a magnification ratio β=−2 (X) and numerical aperture N.A.=0.04, the position of the entrance pupil is −300 mm, as measured from the position of intermediate image 3 (a position of 300 mm at the observed object 1), the position of a first lens surface S1 is −15 mm, as measured from the position of intermediate image 3 (a position of 15 mm at the observed object 1), and the focal length of the overall lens system L0 is f=81.7 mm.

TABLE 5

| Lens Surface | Curvature Radius (r) | Surface Separation (d) | Index of Refraction (nd) | Abbe Number (ν) |
| --- | --- | --- | --- | --- |
| S1 | 22.242 | 10.0 | 1.804109 | 45.55 |
| S2 | −99.314 | 11.0 | 1.612658 | 44.40 |
| S3 | 25.429 | 24.5 | 1.0 | |
| S4 | −10.526 | 2.0 | 1.518601 | 69.98 |
| S5 | 87.353 | 3.0 | 1.860741 | 23.01 |
| S6 | −40.723 | 6.0 | 1.0 | |
| S7 | 322.253 | 3.0 | 1.620409 | 60.14 |
| S8 | −30.856 | 0.5 | 1.0 | |
| S9 | 40.020 | 1.0 | 1.860741 | 23.01 |
| S10 | 16.899 | 5.0 | 1.518601 | 69.98 |
| S11 | −30.955 | | | |

Figure 11A:
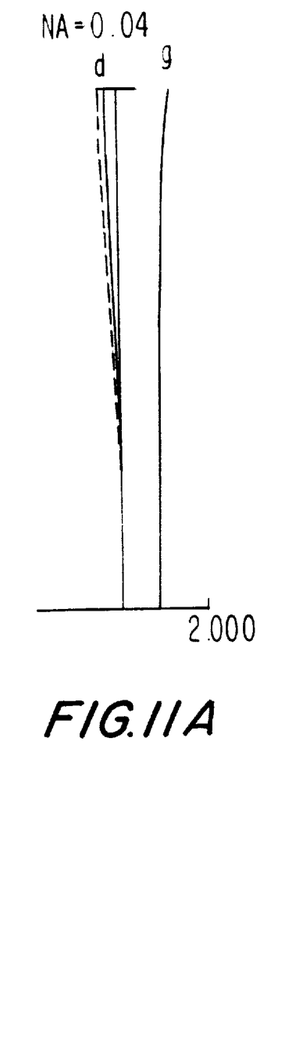
FIG. 11 is a drawing showing spherical aberration, astigmatism-aberration, and distortion-aberration in the microscope photography lens system of the third working example.
Figure 11B:
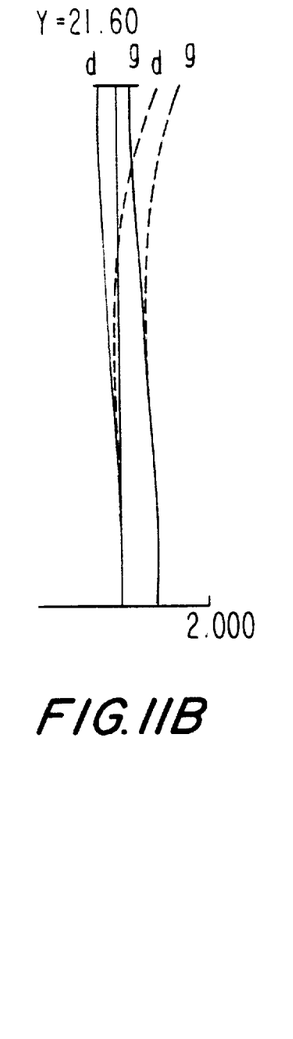
Figure 11C:
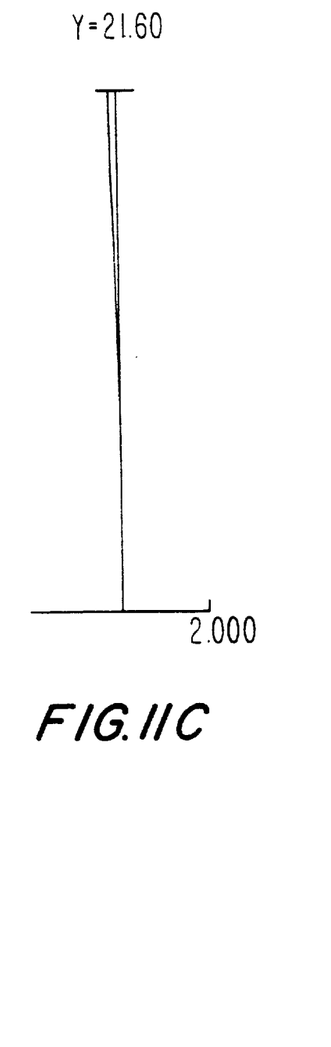
Figure 12:
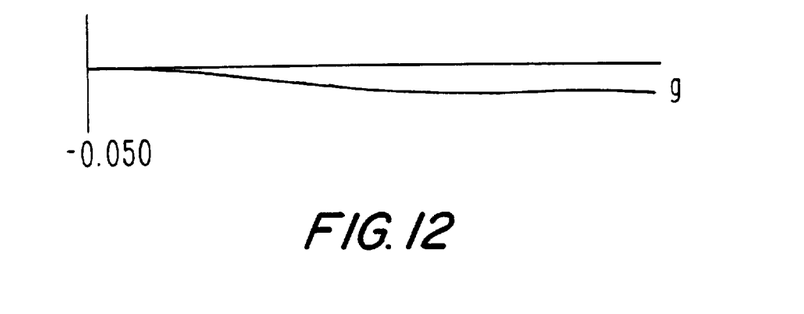
FIG. 12 is a drawing showing lateral chromatic aberration in the microscope photography lens system of the third working example.
Figure 13:
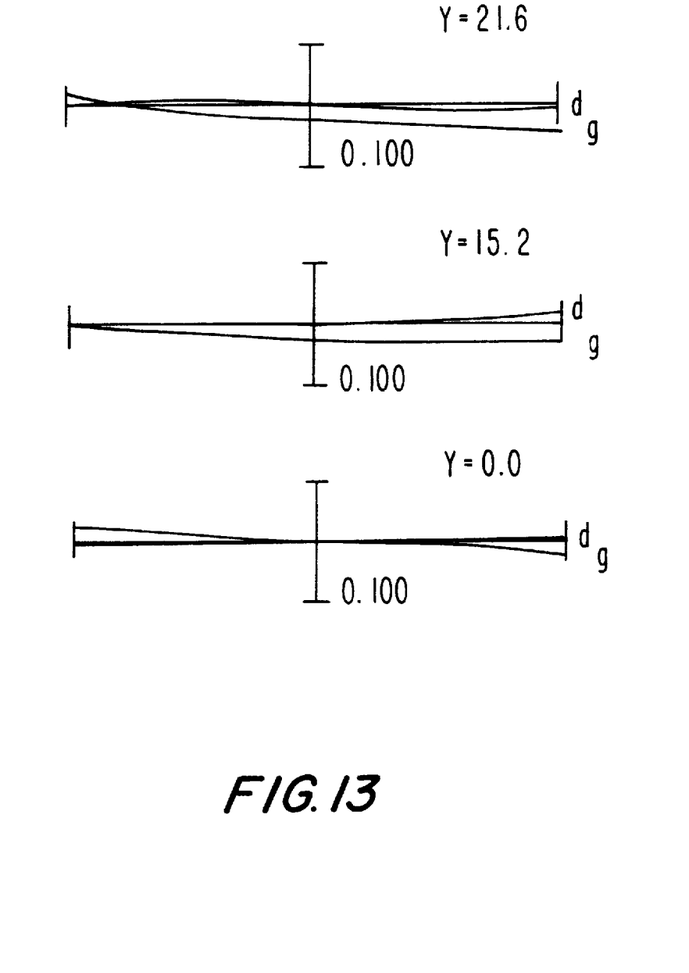
FIG. 13 is a drawing showing coma aberration at image heights of Y=21.6 mm, Y=15.2 mm, and Y=0.0 mm in the microscope photography lens system of the third working example.

FIGS. 11 through 13 show the various aberrations associated with a microscope photography lens system L0 constructed to the above specifications. Shown from left to right in FIG. 11 are spherical aberration (d-line and g-line), astigmatism-aberration (d-line and g-line), and distortion-aberration. In the spherical aberration diagram, the solid line shows the magnitude of the spherical aberration, and the dotted line shows the magnitude of the sine condition violation. In the astigmatism diagram, the solid lines show the sagittal image surface and the dotted lines the meridional image surface. The "d" and "g" in the diagrams denote the d-line and g-line (spectral lines). FIG. 12 shows the lateral chromatic aberration. FIG. 13 shows coma-aberration. In order from top to bottom, are the coma aberrations for image heights of Y=21.6, Y=15.2, and Y=0 (on-axis).

Table 6 lists the values as defined in the above conditional mathematical expressions (1) through (4) for the microscope photography lens system L0 of the present example. The focal length for the third lens group for this example is 26.6 mm.

TABLE 6

$$d/L = -0.23$$
$$D_2/D_1 = 0.25$$
$$(r_{21}/f_3) = -0.40$$
$$(v_{3\,(max)} - v_{3\,(min)}) = 46.97$$

Because the lens specifications can be set to provide well-balanced corrections for the various aberrations, with this configuration, a microscope photography lens having a low magnification ratio, minimal aberrations, and a wide field can be obtained.

I claim:

1. A microscope photography lens system for directing an intermediate image of an observed object formed by an objective lens system onto a photographic surface, wherein said microscope photography lens system comprises, in order, from the observed object:

a) a first lens group having a convex surface facing toward the objective lens system and having an overall positive refractive power;

b) a second lens group having a concave surface facing toward the objective lens system, which is located between said intermediate image and a third lens group, and having an overall negative refractive power; and c) said third lens group having at least two lens elements with a front end facing towards the objective lens system and a rear end, wherein the third lens group has a positive refractive power and wherein the following mathematical relationships are satisfied:

1) $-0.1 \geq d/L \geq -0.4$;
      2) $0.1 \leq D_2/D_1 \leq 1.0$;
      3) $0.2 \leq |r_{21}/f_3| \leq 0.6$; and
      4) $15 \leq (V_{3(max)} - V_{3(min)})$;

wherein:

d is a distance from the intermediate image to the convex surface of said first lens group;

L is a distance from the convex surface of said first lens group to the rear end of said third lens group;

$D_1$ is a distance between said first lens group and said second lens group;

$D_2$ is a distance between said second lens group and said third lens group;

$r_{21}$ is a curvature radius of the concave surface of said second lens group facing towards the objective lens system;

$f_3$ is a focal length of said third lens group;

$v_{3(max)}$ is the highest Abbe number from the lens elements of said third lens group;

$v_{3(min)}$ is the lowest Abbe number from the lens elements of the third lens group; and all distances are positive when they are measured to the photographic surface side from the observed object side.

2. The microscope photography lens system of claim 1, having parameters which satisfy the following conditions:

a) $-0.15 \geq d/L \geq -0.3$;
   b) $0.2 \leq D_2/D_1 \leq 0.8$;
   c) $0.25 \leq |r_{21}/f_3| \leq 0.45$; and
   d) $25 \leq (v_{3(max)} - v_{3(min)})$.

3. The microscope photography lens system of claim 2, wherein said curvature radius ($r_{21}$) has a negative value.

4. The microscope photography lens system of claim 1, wherein said second lens group has a concave surface facing toward the objective lens system.

5. The microscope photography lens system of claim 1, wherein said curvature radius ($r_{21}$) has a negative value.

6. A microscope photography lens system for directing an intermediate image of an observed object formed by an objective lens system onto a photographic surface, wherein said microscope photography lens system comprises, in order, from the observed object:

a) a first lens group having a convex surface facing toward the objective lens system and having an overall positive refractive power;

b) a second lens group having a concave surface facing toward the objective lens system, which is located between said intermediate image, and a third lens group, and having an overall negative refractive power; and c) a third lens group having an overall positive refractive power and wherein the following mathematical relationships are satisfied:

1) $-0.1 \geq d/L \geq -0.4$;
      2) $0.1 \leq D_2/D_1 \leq 1.0$;
      3) $0.2 \leq |r_{21}/f_3| \leq 0.6$; and wherein:

d is a distance from the intermediate image to the convex surface of said first lens group;

L is a distance from the convex surface of said first lens group to the rear end of said third lens group;

$D_1$ is a distance between said first lens group and said second lens group;

$D_2$ is a distance between said second lens group and said third lens group;

$r_{21}$ is a curvature radius of the concave surface of said second lens group facing towards the objective lens system;

$f_3$ is a focal length of said third lens group; and all distances are positive when they are measured to the photographic surface side from the observed object side.

7. The microscope photography lens system of claim 6, having parameters which satisfy the following conditions:

a) $-0.15 \geq d/L \geq -0.3$;
   b) $0.2 \leq D_2/D_1 \leq 0.8$;
   c) $0.25 \leq |r_{21}/f_3| \leq 0.45$; and
   d) $25 \leq (v_{3(max)} - v_{3(min)})$.

8. The microscope photography lens system of claim 7, wherein said curvature radius ($r_{21}$) has a negative value.

9. The microscope photography lens system of claim 6, wherein said second lens group has a concave surface facing toward the objective lens system.

10. The microscope photography lens system of claim 6, wherein said curvature radius ($r_{21}$) has a negative value.

* * * * *